(12) United States Patent
Berry

(10) Patent No.: US 6,293,861 B1
(45) Date of Patent: Sep. 25, 2001

(54) AUTOMATIC RESPONSE BUILDING DEFENSE SYSTEM AND METHOD

(76) Inventor: Kenneth M. Berry, 125 Maple Ave., Wellsville, NY (US) 14895

(*) Notice: Subject to any disclaimer, the term of this patent is extended or adjusted under 35 U.S.C. 154(b) by 0 days.

(21) Appl. No.: 09/389,218

(22) Filed: Sep. 3, 1999

(51) Int. Cl.$^7$ ........................................................ F24F 7/00
(52) U.S. Cl. ........................... 454/255; 454/195; 454/902
(58) Field of Search .................................. 454/255, 256, 454/194, 195, 902

(56) References Cited

U.S. PATENT DOCUMENTS

| | | | |
|---|---|---|---|
| 4,380,187 | 4/1983 | Wicks | 98/39 |
| 4,960,041 | 10/1990 | Kiser | 98/1.5 |
| 5,215,499 | 6/1993 | Eberhardt | 454/256 |
| 5,228,306 | * 7/1993 | Shyu et al. | 62/176.6 |
| 5,462,485 | 10/1995 | Kinkead | 454/256 |
| 5,720,658 | * 2/1998 | Belusa | 454/238 |
| 5,720,659 | 2/1998 | Wicks | 454/256 |

\* cited by examiner

Primary Examiner—Jiping Lu
(74) Attorney, Agent, or Firm—Nixon Peabody LLP; Daniel W. Sixbey

(57) ABSTRACT

A building protection system and method is provided which is responsive to the release of hazardous agents both outside and inside of a protected building. For an outside release, an array of sensors surrounding the perimeter of the building is triggered to provide and indication that an external release has occurred. These external sensors operate in real time and are set at relatively high thresholds to prevent false positives. Upon initial detection of a release in a concentration above the threshold level of a perimeter sensor, a central processor connected to receive a release signal from the sensor will shut down all external air exchanges for the building and activate an over-pressure system for the building interior to insure that contaminated external air does not enter. Exterior sampling inlets are monitored to determine if high agent concentrations exist as a confirmation of the indication given by the perimeter sensors. Should an internal attack occur in the entrance area, or other internal area of a protected building, an internal sensor system will cause the central processor to close off the affected area, and activate the over-pressure system to pressurize unaffected areas. Sampling inlets connected in various areas within the building will monitor these areas to determine if they have been contaminated and the concentration and type of contaminating agent. The processor can activate a decontaminant spray system to decontaminate the contaminated areas.

39 Claims, 4 Drawing Sheets

AUTOMATIC RESPONSE BUILDING DEFENSE SYSTEM AND METHOD

BACKGROUND OF THE INVENTION

In the past, terrorist attacks on buildings have primarily involved the use of conventional weapons such as explosives, incendiary devices and firearms. Thus building defense systems presently in use are designed to protect against such conventional weapons and involve measures such as physical barriers, fire alarms, metal detectors, security checks and armed security personnel. The discovery of nuclear agents and the development of nuclear weapons and airborne chemical and biological contaminants and toxins has provided terrorists with sophisticated assault weapons against which present building defense measures are totally inadequate. An assault with a single or a combination of multiple hazardous airborne, waterborne or foodborne contaminants can occur with no perception of danger by the potential victims within a building. Such an assault can be particularly devastating when implemented by an aggressor from within the confines of a target building who is willing to sacrifice his or her life in the attack.

Systems for controlling the environment within a building have been developed which are responsive to combustion based pollutants in the outside air. Such systems, as illustrated by U.S. Pat. No. 5,462,485 to Kinkead, vary the amount of outside air drawn into a building in response to the concentration of a single pollutant in the outside air.

Additionally, a number of systems have been developed to provide conditioned air to a building interior in response to emergency conditions caused by smoke or harmful gasses. U.S. Pat. Nos. 4,380,187 and 5,720,659 to Wicks, 4,960,041 to Kiser and 5,215,499 to Eberhardt all disclose systems of this type.

None of the known prior art systems will effectively protect a building against an attack with airborne nuclear, biological or chemical contaminants from without or within the building. Furthermore, known systems are not capable of responding to different types of airborne contaminants used in combination.

SUMMARY OF THE INVENTION

It is a primary object of the present invention to provide a novel and improved system and method for automatically responding to the presence of hazardous agents externally on the premises surrounding a building and/or within the building. This system can also be adapted to respond when these agents are waterborne or foodborne.

Another object of the present invention is to provide a novel and improved system and method for protecting a building or sections thereof from airborne chemical, biological and nuclear agents by detecting in real time the presence of a hazardous concentration of one or more of such agents externally and/or internally of a building and immediately sealing the interior of a yet uncontaminated building or uncontaminated sections of the building and pressurizing the sealed area to prevent entry and distribution of the contaminated external atmosphere.

Yet another object of the present invention is to provide a novel and improved system and method for protecting a building from airborne chemical, biological and nuclear agents using a network of external and internal agent sensors connected to a central control processor. Separate external sensors for chemical, for biological and for nuclear agents are spaced from the building and are set at relatively high threshold detection levels to prevent false positives. Similar sensors within the building are set to sense both levels above the hazardous range for each agent and when a safe level below the hazardous range occurs.

Still another object of the present invention is to provide a novel and improved system and method for protecting a building from airborne chemical, biological and nuclear agents using a network of sensors for each agent connected to a central control processor. Once an agent is detected, it is sampled and identified with identification data being provided to the central control processor which will provide an identification of the agent or agents to personnel within the building and to a remote operations center. The processor will further provide an indication as to whether the agent was detected externally or internally of the building.

Yet a further object of the present invention is to provide a novel and improved system and method for protecting a building from airborne chemical, biological and nuclear agents which include a network of sensors for each agent connected to a central control processor. The sensors are placed in all areas of a building and provide an indication to the processor of which areas are contaminated and the type and level of contamination in each area.

A still further object of the present invention is to provide a novel and improved method and system for protecting a building from airborne chemical, biological and nuclear agents wherein a central processor activates a decontamination system when an agent is detected within the building.

These and other objects of the present invention are accomplished by providing a building protection system responsive to the release of chemical, biological and nuclear airborne agents both outside and inside of a protected building. For an outside release, an array of sensors surrounding the perimeter of the building is triggered to provide an indication that an external release has occurred. These external sensors operate in real time and are set at relatively high thresholds to prevent false positives. Upon initial detection of a release in a concentration above the threshold level of a perimeter sensor, the central processor connected to receive a release signal from the sensor will shut down all external air exchanges for the building and activate an over-pressure system for the building interior to insure that contaminated external air does not enter. Exterior sampling inlets are monitored to determine if high agent concentrations exist as a confirmation of the indication given by the perimeter sensors.

Should an internal attack occur in the entrance area of a protected building, an internal sensor system will cause the central processor to close off the entrance area, exhaust air from the closed area through a filter, and activate the over-pressure system. Sampling inlets connected in various areas within the building will monitor these areas to determine if they have been contaminated and the concentration and type of contaminating agent. The processor can activate a decontaminant spray system to decontaminate the contaminated areas.

DESCRIPTION OF THE PREFERRED EMBODIMENTS

Figure 1:
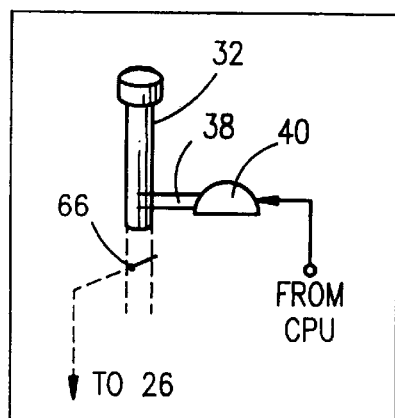
FIG. 1 is a perspective view of a building with the automatic response defense system of the present invention.
Figure 1:
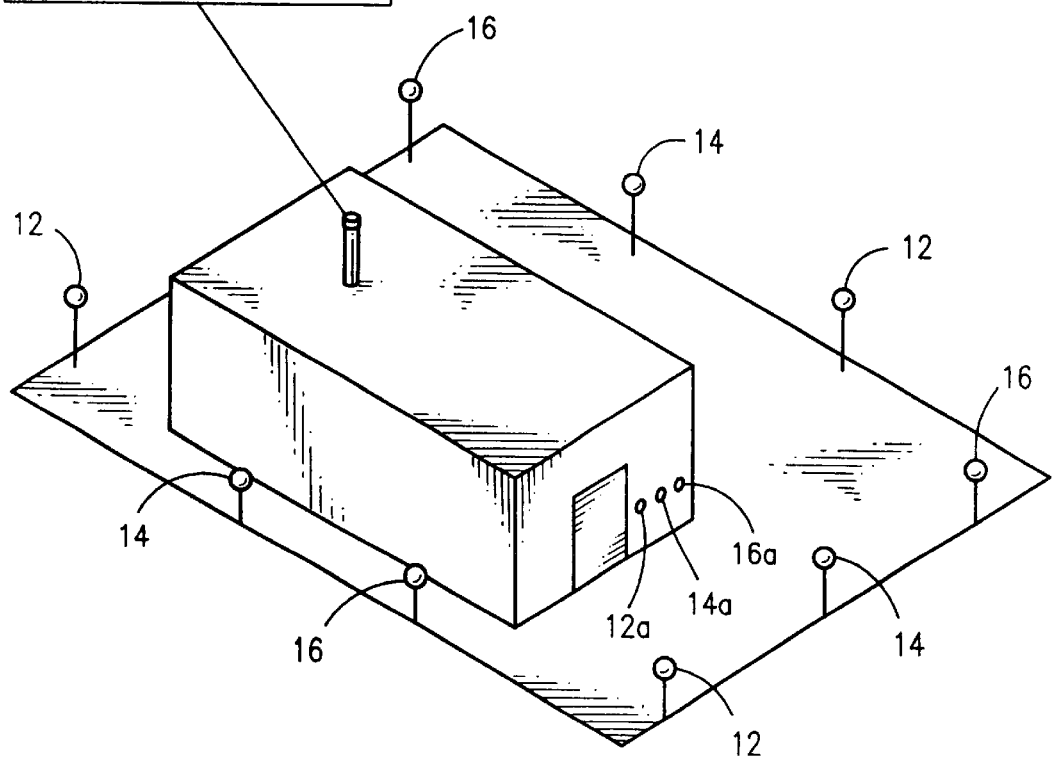
Figure 5:
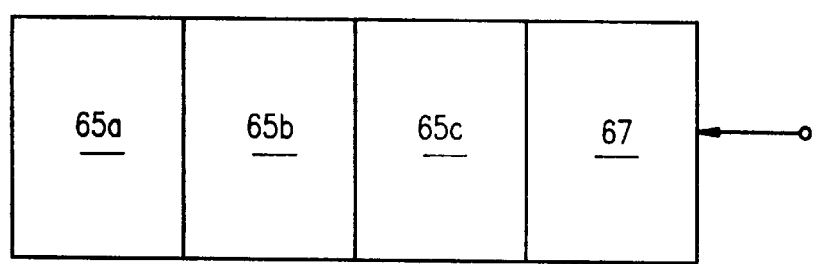
FIG. 5 is a block diagram of a medical kit for use with the automatic response building defense system of the present invention.
Figure 2:
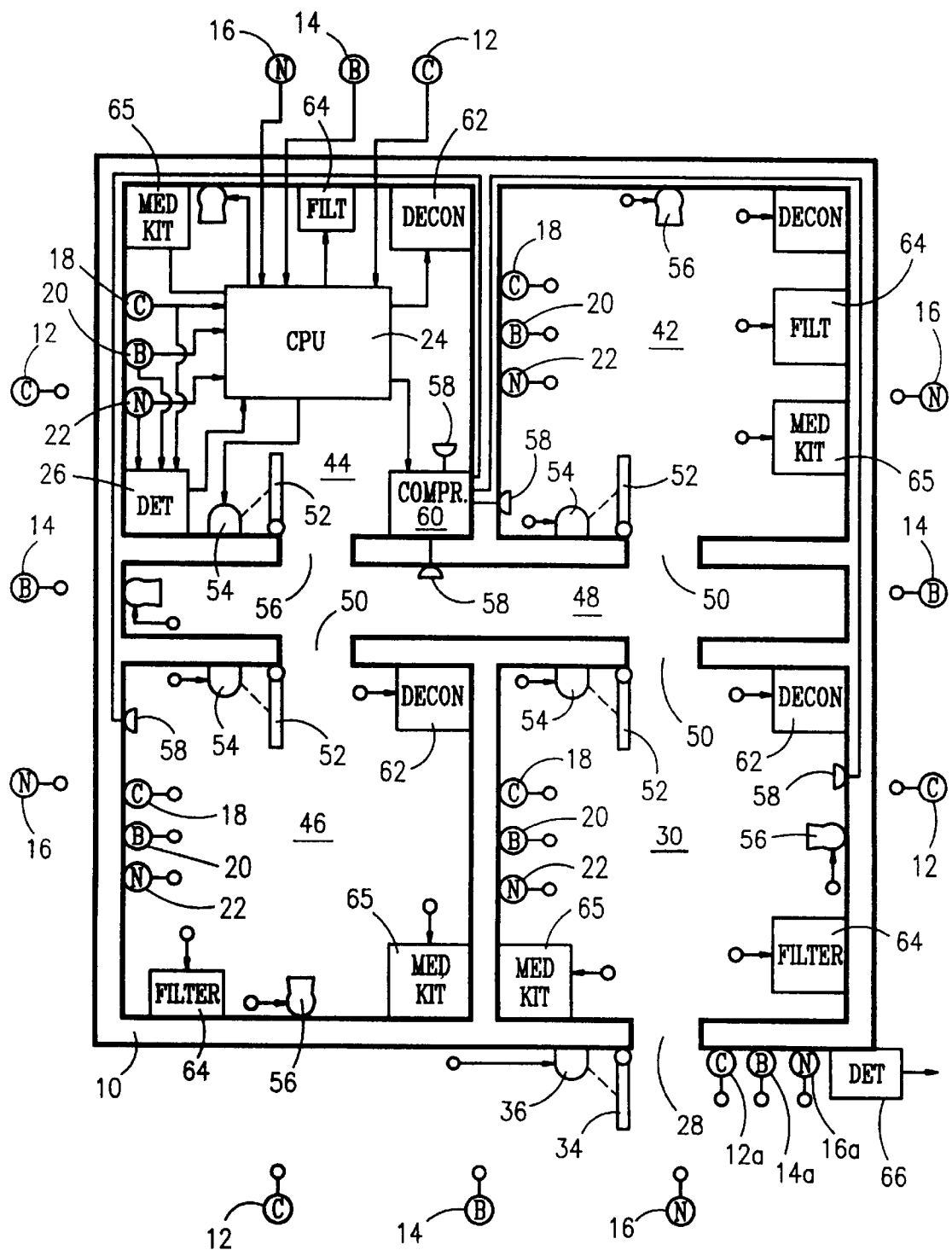
FIG. 2 is a diagrammatic illustration of the automatic response building defense system of the present invention.
Figure 3:
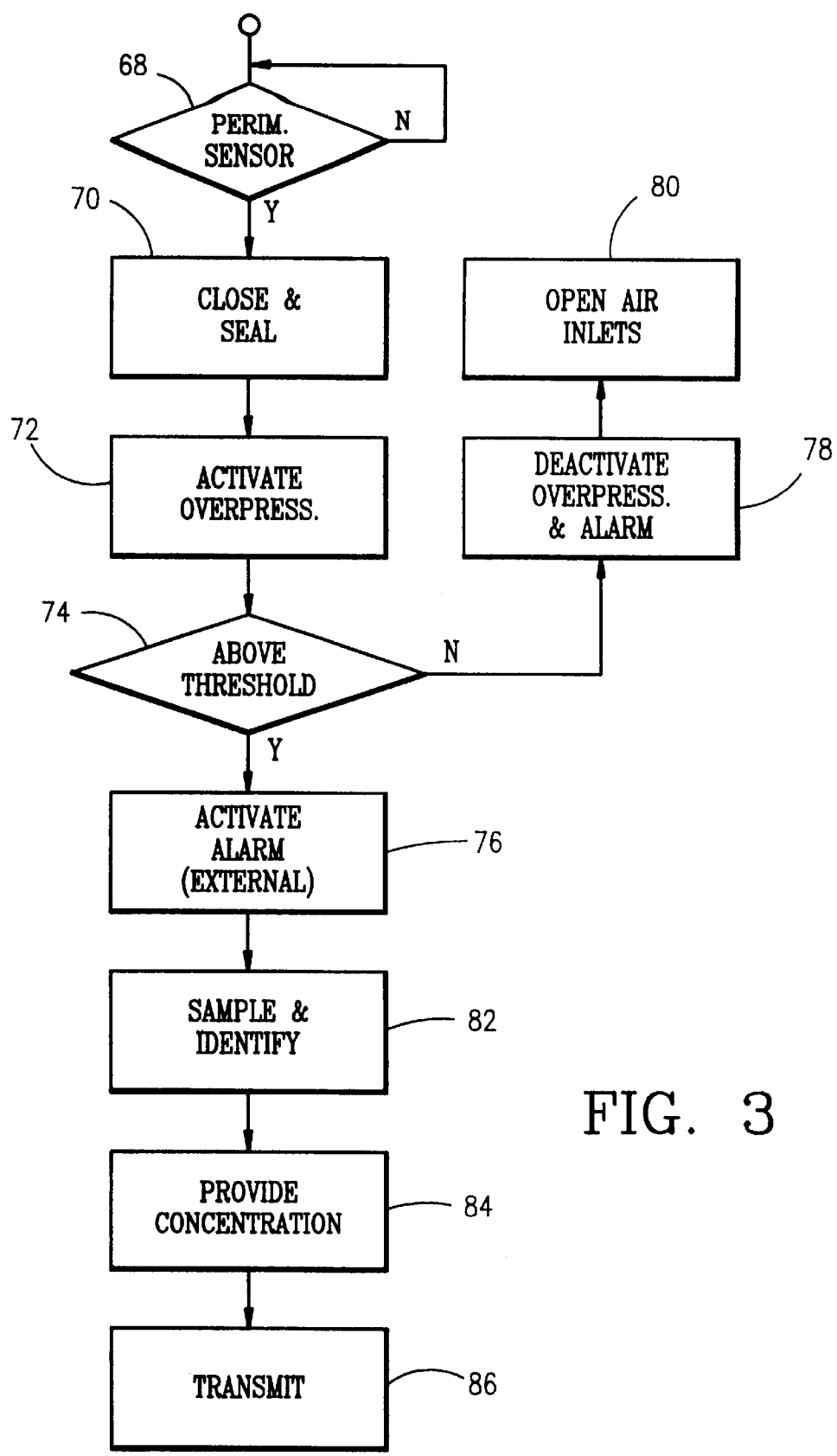
FIG. 3 is a flow diagram illustrating the operation of the central processor of FIG. 2 in response to perimeter sensors.

Referring to FIGS. 1 and 2, a building 10 to be protected is surrounded by spaced perimeter sensors which include, for example, chemical agent sensors 12, biological agent sensors 14 and nuclear sensors 16. It should be noted that other sensors for other hazardous agents, such as allergens, etc. can be provided to function in the manner described for the sensors 12, 14, 16, 18, 20 and 22. Similarly each room in the interior of the building includes chemical agent sensors 18, biological agent sensors 20 and nuclear sensors 22. These sensors are all connected to a central processor unit 24 and may also be connected to a central detection and identification suite 26 which provides agent identification data to the central processor unit. All sensors are connected to the central processor unit and central detection and identification suite in the manner shown for selected sensors in FIG. 2.

External air communication openings to the exterior of the building are depicted as a main entrance 28 to a lobby 30 and a roof vent 32. A door 34 closes and seals the main entrance door and is driven to a closed and sealed position by a signal activated drive unit 36 which receives an activation signal from the central processor unit 24. Similarly, the roof vent 32 is closed and sealed by a closure 38 which is driven to close the roof vent by a signal activated drive unit 40 which receives an activation signal from the central processor unit 24. There may, of course, be additional exterior air communication openings, and all must be provided with a closure member driven to a closed and sealed position by a signal activated drive unit which receives an activation signal from the central processor unit 24. However, to effectively close the building 10 and exclude external hazardous airborne contaminants, it is best to limit exterior air communication openings to the minimum number required for access and proper ventilation.

Internally within the building 10 are a plurality of rooms forming internal building enclosures. In addition to the lobby 30, three rooms 42, 44 and 46 with a joinder hall 48 are shown for purposes of illustration. Of course it should be understood that the building can contain many more similarly equipped rooms. External air communication openings for each room are depicted by doorways 50 which can be closed and sealed by doors 52. Each door 52 can be driven to a closed and sealed position by a signal activated drive unit 54 which receives an activation signal from the central processor unit 24. Each room also includes, in addition to hazardous airborne agent sensors, an alarm 56 activated by the central processor unit and one or more compressed air inlets 58 connected to receive air or gas under pressure from a compressor assembly 60. Each room may also include a decontaminant input 62 from a decontaminant system activated by the central processor unit as well as a filter system input 64 activated by the central processor unit.

Each room 30, 42, 44 and 46 also includes a medical kit 65 having color coded container sections 65a, 65b and 65c containing medical and decontaminant materials for treating victims of each sensed hazardous agent. For example, container section 65a will be colored yellow and contain materials to treat victims of a radiological attack; container section 65b will be colored blue and contain materials to treat victims of a biological agent; and container section 65c will be colored green and contain materials to treat victims of a chemical agent attack. In addition to, or in place of the container sections 65a, b and c, the medical kit 65 can include an integrated, computerized drug cart 67 (such as the Pyxis system) which receives information from the central processor unit 24 and responds thereto to provide the proper treatment and decontaminant materials for a sensed hazardous material based upon integrated data from the sensors and the central detection suite 26.

Detection suites 66 will house the chemical and biological detection equipment and will be located near the air entry points of the building (lobby, air intake ducts, etc.). These will be based on the Computing Devices Canada's (CDC's) 4WARN integrated chemical/biological detector with an upgraded chemical detection suite 26.

The upgraded chemical detection suite 26 will be based on Orbital Science Corporations Gas Chromatograph/Ion Mobility Spectrometer (GC/IMS) detector technology. This technology has proven low-level detection and unprecedented low false alarm rates. The GC/IMS subsystem will provide detection of high-level concentrations with direct IMS sampling and the use of GC/IMS for ultra-low level concentrations with extremely low false positive alarm rates.

Radiological contamination will be monitored at 66 using existing proven detection technology and will be located at the air entry points of the building. This equipment will interface with the Central Detection Suite 26 so that alarm information will be communicated to the central processor unit. Equipment for monitoring radiological contamination, such as Nuclear Research Corporation's standard military AN/VDR-2 or ADM-3000, are potential candidates for integration into the system.

In the event of a chemical, biological or nuclear attack from outside the building 10 perimeter, the relevant affected sensors 12, 14 or 16 will provide a signal to the central processor unit 24 if the concentration of the sensed hazardous airborne agent exceeds the threshold level set for the particular perimeter sensor involved. For such an attack to be successful a very high concentration of each agent must be released, and therefore the perimeter sensors 12, 14 and 16 are set at relatively high threshold levels which must be exceeded for the sensor to respond. This prevents most false positives.

The perimeter and internal building monitoring will be accomplished using high level (parts per trillion) point chemical detectors 12 and 18 such as Environics M 90 detector or Graseby's ACADA detector. Chemical agent detection and identification should occur in real time (within 15 seconds for normal attack concentrations and two minutes for ultra low parts per trillion levels). Accordingly, the capability of the chemical detectors will detect up to the parts per trillion level. However, parts per billion is indicated for the high concentration levels of agents originally released in an attack. Also, detectors must be able to detect to levels below time weighted averages (TWA) to the parts per trillion level for ensuring safe return upon decontamination of a facility. Chemical detectors should be able to detect nerve agents (GA, GB,GD, GF, VX and others), vesicants (H, HG, L), cyanides, (AC, CK), pulmonary agents (CG, PFIB and HC and others) riot control agents (CS, CN, and others), and standard hazmat chemicals (i.e., chlorine, carbon monoxide, carbon tetrachloride, etc. etc.), and other poisonous chemicals (i.e., dioxin, etc.) also to the aforementioned levels in the aforementioned manner.

The perimeter and internal building biological agent detectors 14 and 20 must detect biological agents in real time (within 15 seconds) and identification of these agents must be provided within 20 minutes. The biosensors must be able to detect to less than 10 agent containing particles per liter of air for biological agents to ensure protection against infective agents where one particle is potentially deadly, to ensure monitoring and successful decontamination for safe reentry, and also for protection against prolonged insidious bio-attack. Moreover, 100 agent containing particles per liter of air for biologic agents will be the normal threshold for perimeter monitoring as it is estimated most terrorist attacks will have high initial levels of biologic agents during an attack. This strategy will minimize false positive since this initial number will most probably be a thousand or more agent containing particles per liter of air for biological agents in an initial release. Hence, the biological detectors set at 100 agent containing particles per liter of air for biologic agents will detect the 1000 or more level with good sensitivity and specificity.

These bio-detectors will be able to detect and subsequently identify the following: anthrax, cholera, Q fever, glanders, plague, brucellosis, viral encephalitides (VEE, WEE, EEE), viral hemoragic fevers, (AHF, BHF, LASSA Fever, CCHF, RVF and others), small pox, botulinum toxin, SEB (Staphylococcal enterotoxin B), Ricin, and trichothecene mycotoxins. Additionally, Tick-borne encephalitis complex agents, yellow fever virus, Dengue virus, Francisella tularensis, and others. Toxins such as shiga toxin, tetanus toxin, abrin toxin, diptheria toxin, maitotoxin, palytoxin, ciguatoxin, textilotoxin, batrachotoxin, alpha conotoxin, taipoxin, tetrodotoxin, alpha tityustoxin, saxitoxin, anatoxin, microcystin, aconitine, and others should also be detectable.

Finally, it is essential that the perimeter and internal building nuclear detectors 16 and 22 provide alpha, beta and gamma detection. Sensing virtually any definable alpha, beta, and/or gamma level which is above a respective environmental baseline (involving any alpha, beta, or gamma activity) would be considered a positive sensing which would cause an alarm. It is viewed that neutron or other radiologic detection would not be indicated in scenarios of terrorist attacks on buildings. This alpha, beta, gamma sensing would occur in real time and would accordingly trigger a warning in real time, i.e., immediately or in 7 seconds or less.

Subsequent to detection and warning is nuclear agent identification. Such capability shall occur in a less than 15 minute time period and entails identification of Americium 241, Cesium 134–137, Cobalt 60, Iodine 131, Thallium, Phosphorus 32, Plutonium metal or salt 238–239, Plutonium high-fired oxides 238–239, Polonium 210, Radium 226, Strontium 90, tritium, Uranium Oxides and nitrates 238–235, Uranium High oxides hydrides, carbides, salvage ash 238–235, and Depleted Uranium and Uranium Metal 238, and others. This identification would enable specific agent(s) identification thereby enabling greater radiation exposure and clinical dosimetry estimates involving specific alpha, beta and/or gamma emitters and would also allow for better estimations of internal contamination in view of the respective radionucleotide(s) primary target organ(s) and toxicities. For example, iodine 131 would affect mostly the thyroid requiring specific intervention within a critical time period (i.e., Potassium Iodide 300 mg within 1–3 hours); another example, Cobalt 60 (known to be a gamma emitter) requires a similar immediate protective response (masks and personal protective equipment) but with more involved and focused PPE and shelter efforts and subsequent decon and treatment protocols because of the more penetrating nature of the gamma radiation.

The chemical, biological and nuclear detection systems must be capable of interfacing with a local alarm and information distribution system and must provide timely and clear indications of a detected threat. The overall system must operate effectively to: (1) detect agents in real-time to warn personnel to adopt protective measures; (2) identify agents in time to treat anyone affected; (3) monitor levels of contamination; (4) collect samples for verification; and (5) provide critical information to support decision-making.

The proposed solution to successfully manage a hazardous agent airborne attack requires the fusion of all information associated with the incident to be available at a central location to knowledgeable, trained personnel. This can be provided by a central processor unit 24, based on a Pentium II microprocessor. The central processor will monitor all detectors and sensors employed around and throughout the building. It will also automatically control all protective systems, such as collective protection equipment and ventilation intake control and provide alarm updates. Satellite links can then relay all data to other designated centralized command and control entities in real-time.

When the central processor unit 24 receives a signal from one or more of the perimeter sensors 12, 14 or 16 at 68, the processor acts at 70 to send an activation signal to the signal activated drive units 36 and 40 to close and seal all external air communication openings. Then, at 72 the central processor unit activates the compressor assembly 60 which will provide pressurized air or gas through the compressed air inlets 58 throughout the building 10 to rapidly raise the pressure internally within the building to a level above atmospheric pressure present externally of the building. The internal building pressure should be raised within a preferred range of from 3 to 10 PSI above that of the ambient atmospheric pressure, and this will effectively provide positive pressure protection for the building interior against an external incoming aerosol cloud containing chemical, biological or nuclear agents. If the building interior were not pressurized, these agents could filter in through cracks and small openings in the building which cannot all be effectively sealed. There are no adverse physiological or medical affects to humans from positive pressures in the 3 to 10 PSI range and pressures from 3 to 7 PSI are not detectable by humans. Consequently, the central processor unit 24 can be manually operated to pressurize the building 10 within a range of from 3 to 7 PSI in advance if an attack with airborne hazardous agents is anticipated.

The central detection and identification suite 26 monitors the detection suites 66 at a base hazardous threshold level for each hazardous airborne agent and provides data to the central processor unit. If this threshold level is exceeded, the central processor senses this at 74 and causes the alarms 56 at 76 to provide an indication that the attack is external. Conversely, if at 74 the central processor unit notes that the threshold has not been exceeded and the perimeter detectors indication of a dangerous condition cannot be confirmed, it deactivates the alarm and the compressor 60 at 78 and reopens the air inlets at 80. Sensors 12a, 14a, and 16a exteriorly located adjacent to the building and spaced from the perimeter sensor locations sense the concentration of the hazardous airborne contaminant adjacent to the building to determine if the concentration is above the base hazardous threshold level. The base hazardous threshold level is a level lower than the threshold level for the perimeter sensors.

The initial alarm is directly activated by the sensor which senses a hazardous concentration of an airborne, waterborne or foodborne agent, but the processor unit 24 can operate subsequent to an attack to cause the alarms 56 to provide updated information to building occupants. Upon detection of hazardous agent levels in real time, an alarm with a well defined high pitch tone, volume and frequency is triggered. A secondary general alarm will then occur within seconds thereafter and will be one of two types: (1) low pitch for an external threat and (2) high pitched for an internal threat within the building. A public address system and an individual voice beeper system can also be activated as part of the alarm assembly.

Next, at 82 the central processor unit causes the central detection and identification suite 26 to sample and identify the detected hazardous agent and the processor will output this identification. This can be accomplished on the basis of voice chip announcements and/or auditory beeps over the alarm system. One beep represents a nuclear threat: two beeps represent a biological threat; and three beeps will represent a chemical threat (each with high or low pitched differentiation to distinguish an internal vs. external threat). Also, a yellow flash will indicate a nuclear threat, a blue flash will represent a biological threat, a green flash will represent a chemical threat. These colors correspond to the colored sections of the medical kits 65 and tell persons treating victims which treatment and decontaminant materials to use.

Further, at 84, the central processor unit can have the central detection and identification suite 26 in conjunction with the sensors provide the concentration of the hazardous agent(s) detected, and this information could then be transmitted at 86 over the alarm system as well as the transmission of all attack data via a classified transmission to a remote operations center.

Figure 4:
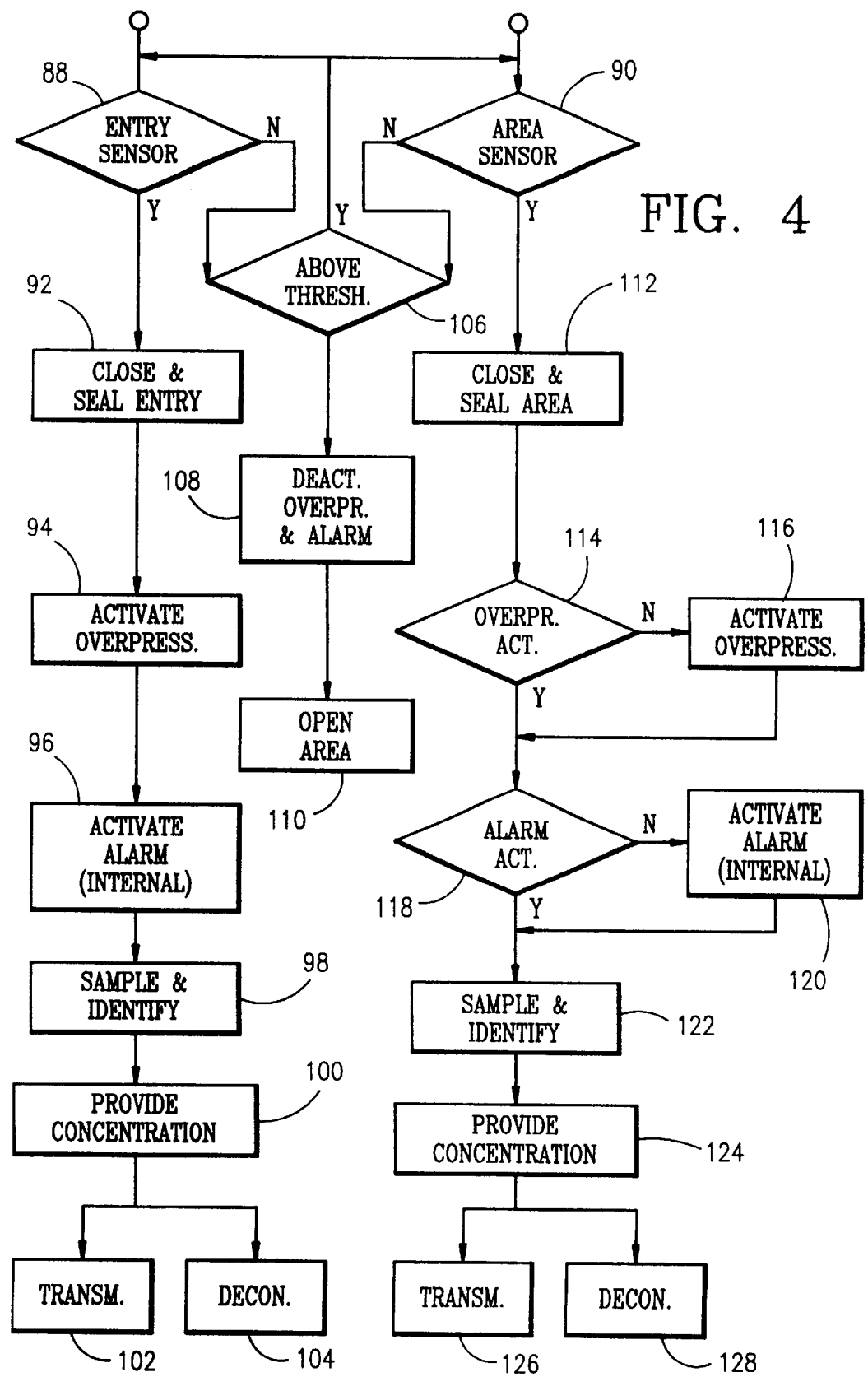
FIG. 4 is a flow diagram illustrating the operation of the central processor of FIG. 2 in response to internal sensors.

Turning now to FIG. 4, should an attack occur inside the building 10 in either the entry area 30 or one of the rooms 42, 44, or 46, the central processor unit will respond at 88 to detectors in the entry area or at 90 to detectors in one or more of the rooms. Of course if an attack occurs for example in the entry area and hazardous levels of an agent escape into one or more of the rooms, the central processor unit will respond to sensors in both the entry area and the affected room or rooms.

The detectors 18, 20 and 22 can be similar to those used in perimeter detection, or they may be formed by sampling lines connected to the central detection and identification suite 26 as shown in FIG. 1. If the hazardous agent is released in the entry area 30, upon detection the central processor unit 24 will operate at 92 to close and seal the entry area. Thus the doors 34 and 52 will be shut to close the entrance 28 and the doorway 50 to seal the entry area. Then at 94 the central processor unit will activate the compressor 60 to pressurize the unaffected areas of the building such as the rooms 42, 44 and 46, and the hallway 48. This will prevent significant amounts of the hazardous agent from penetrating these areas.

At 96 the alarm system is activated indicating that an internal attack has occurred, and at 98 the agent is identified and the concentration level of the agent is determined at 100 in the manner previously described. The remote operations center is then notified at 102.

Finally, for an internal attack, the sealed area can be decontaminated at 104 under the control of the central processor unit. For internal or external source contamination, a 1 to 4 micron aerosol fog including decontamination solution that is non-corrosive, non-toxic, non-conductive and environmentally safe can be sprayed by a decontamination system 62. Other substances and treatments can also be used as indicated (i.e., aerosolized Sublimaze followed by aerosolized Narcan for hostage retrieval, also aerosolized GD5 aerosol for a chemical agent attack, etc.) Additionally, filters 64 can be activated to filter contaminants from the affected area.

When the detectors in the affected area indicate to the central processor unit at 106 that the decontamination process has been effective and the concentration of the airborne agent has dropped below the hazardous threshold, the processor 24 will deactivate the compressor at 108 and open the previously closed area at 110. This may also be manually accomplished by a manual override system If an attack occurs in one of the other rooms in the building 10 or one of these rooms becomes contaminated, from an attack in another area, such as the entry area, the area sensors 90 will signal the central processor unit 24 which will close the affected area at 112. Then at 114, the processor will check to determine if the unaffected areas have been pressurized, and if they haven't, the compressor 60 is activated at 116 to pressurize the unaffected areas. At 118, the processor checks to see if the alarm has been activated, and if not, the alarm with an internal attack indication is activated at 120. Then, as previously indicated with respect to an entry area attack, the processor receives an identification of the attack agent at 122, concentration data at 124, and initiates a remote transmission at 126 and affected area decontamination at 128.

The operation of the central processor unit 24 in conjunction with the detectors 18, 20 and 22 and the central detection suite 26 to identify "safe rooms" within the building 10 which are not contaminated, the identity and type of agent used in an attack and the concentration of the agent in each affected area of the building is extremely important when an attack occurs within the building 10. This information is invaluable to the effective post attack treatment of victims from the attack. Also, an automated personnel tracking system linked to the central processor 24 which provides personnel identification based upon identification badges and badge sensors in the areas of the building, will indicate who was in the building and in which areas during the attack and who has reached the safe rooms after the attack. This information aids in rapid victim location and treatment.

An automated, telemetric victim triage tag system can be provided and linked to the central processor unit 24. This triage tag system will provide dynamic, real time status reports with updates on all tagged victims of an attack. Each victim will be given a battery powered tag transmitter having a telemetric capability. Color coded buttons on the tag correspond to the various conditions of a victim; i.e., OK, mild, moderate, severe, dead. The real time status of each victim can be periodically transmitted by pushing the appropriate button on each tag.

For a nuclear attack, information of dosimetry and specific agent identification will determine the need for initial secondary treatment within the first one to two hours after the attack. For example, it could determine that a significant contamination of (1) iodine 131 had occurred necessitating urgent therapy with potassium iodide, or (2) an Americium 241 dispersal had occurred necessitating chelation therapy with DTPA or EDTA within preferably 1 to 2 hours after the initial attack and exposure. This could be initiated in the safe room areas (or immediately beyond) that could store these secondary urgent treatments to be administered in 1 to 2 hours post attack.

For biological agent victims, within 1–3 hours appropriate antibiotics and other treatment modalities should be initiated. Also, quantitative bio-sensor data as to the type of agent and the quantity and quantitative distribution can be correlated with data involving victim(s) location(s) to assess the need for mild, moderate, or severe treatment intervention. For example, if it was determined that an anthrax attack had occurred and the entry area 30 had concentrations in excess of 100,000 spores per liter of air it would be prudent to immediately treat these victims with IV antibiotic therapy and very close observation with planned intensive care capability in the next phase of the system. However, if room 42 only had 3,000 spores per unit of concern, this may indicate oral (less aggressive) therapy and subsequent support.

Victims of chemical agents who have initially been decontaminated, need to be rechecked within ¼ hour to determine if additional decontamination and treatment is required. This occurs because of secondary vaporization of many of the chemicals (especially nerve agents and vesicants from the skin and the internal interactions therewith). Chemical patients frequently require large amounts of atropine (particularly in the case of nerve agents) and the subsequent need for intensive care capabilities for severely affected victims.

I claim:

1. A method for protecting a building against a personnel attack by one or more biological, chemical and nuclear hazardous airborne contaminants, the building having one or more external air communication openings between a building interior and a building exterior, the method including:

sensing exteriorly of the building the concentration of one or more of said hazardous airborne contaminants at one or more perimeter locations spaced from the building, determining when the concentration of any hazardous airborne contaminant sensed at a perimeter location is at or above a first contamination level for said hazardous airborne contaminant, immediately closing and sealing said external air communication openings when the concentration level for any of said hazardous airborne contaminants at a perimeter location reaches or exceeds said first contamination level for the respective hazardous airborne contaminant, and pressuring the interior of the building to a pressure above the pressure externally of the building after closing and sealing said air communication openings.

2. The method of claim 1 wherein the interior of the building is pressurized within range from 3 to 10 PSI.

3. The method of claim 1 which includes sensing interiorly of the building the concentration of one or more of said hazardous airborne contaminants in the interior of the building, determining when the concentration of any hazardous airborne contaminant in the interior of the building is at or above a second contamination level for said hazardous airborne contaminant, said second contamination level for each said hazardous airborne contaminant being less than first contamination level for the respective hazardous airborne contaminant.

4. The method of claim 3 wherein said second contamination level for each such hazardous airborne contaminant is the minimum level at which said hazardous airborne contaminant is injurious to humans.

5. The method of claim 4 which includes maintaining the external air communications openings closed and sealed and the interior of the building pressurized above the pressure externally of the building until the concentration of all internally sensed hazardous airborne contaminants drops below the second contamination level therefor.

6. The method of claim 4 which includes operating after said external air communications openings have been closed and sealed to sense at one or more exterior building locations adjacent to the building and spaced from the perimeter locations the concentration of each said hazardous airborne contaminant at said exterior building location, sensing interiorly of the building the concentration of each said hazardous airborne contaminant, determining if the concentration of each hazardous airborne contaminant at said exterior building location and interiorly of the building is at or above said second contamination level therefor, and opening said external air communication openings and depressurizing the interior of the building when the concentration of all said hazardous airborne contaminants sensed at said one or more exterior building locations adjacent to the building and interiorly of the building is below the second concentration level for said hazardous airborne contaminant.

7. The method of claim 6 which includes identifying each hazardous airborne contaminant sensed at a perimeter location having a concentration level at or above the first concentration level therefor, providing a notification within said building of the identity of each such identified hazardous airborne contaminant having a concentration level at or above the first concentration level therefor, identifying each hazardous airborne contaminant sensed interiorly of the building having a concentration level at or above the second concentration level therefor, and providing a notification within said building of the identity of each such identified hazardous contaminant sensed within the building interior having a concentration level at or above the second concentration level therefor.

8. The method of claim 1 which includes operating after said external air communications openings have been closed and sealed to sense at one or more exterior building locations adjacent to the building and spaced from the perimeter locations the concentration of each said hazardous airborne contaminant at said exterior building location, determining if the concentration of each said hazardous airborne contaminant at an exterior building location is at or above a second contamination level for said hazardous airborne contaminant, and opening said external air communication openings and depressurizing the interior of the building when the concentration of all of said hazardous airborne contaminants at the exterior building location is below said second contamination level therefor.

9. The method of claim 8 wherein said second contamination level is less than said first contamination level.

10. The method of claim 9 wherein said second contamination level for each such hazardous airborne contaminant is the minimum level at which said hazardous airborne contaminant is injurious to humans.

11. The method of claim 10 which includes sensing hazardous airborne contaminants including biological agents.

12. The method of claim 10 which includes sensing hazardous airborne contaminants including chemical agents.

13. The method of claim 10 which includes sensing hazardous airborne contaminants including alpha, beta and gamma radiation.

14. The method of claim 10 which includes sensing hazardous airborne contaminants including biological agents, chemical agents and alpha, beta and gamma radiation.

15. The method of claim 1 which includes identifying each hazardous airborne contaminant sensed at a perimeter location having a concentration at or above the first contamination level for said respective hazardous airborne contaminant and provided a notification within said building of the identity of each such identified hazardous airborne contaminant.

16. A method for protecting a building against a personnel attack by one or more biological chemical or nuclear hazardous airborne contaminants, the building having an interior divided into a plurality of separate, enclosed areas, each enclosed area having one or more communicating openings to the exterior of the enclosed area, the method including:

sensing for the concentration of one or more of said hazardous airborne contaminants in each enclosed area, determining when the concentration of any hazardous airborne contaminant in any enclosed area is at or above a first contamination level for the respective hazardous airborne contaminant to render each enclosed area containing a hazardous airborne contaminant with a concentration level at or above the first contamination level therefor a contaminated area, immediately closing and sealing the communicating openings to the exterior of each contaminated area when the concentration level for any hazardous airborne contaminant therein is at or above the first contamination level for said hazardous airborne contaminant, and pressurizing to a pressure above the pressure in each contaminated area enclosed uncontaminated areas within the interior of the building in which no hazardous airborne contaminant with a concentration level at or above the first concentration level therefor is sensed.

17. The method of claim 16 wherein one or more of said separate, enclosed areas includes an outside communicating opening to the exterior of the building, the method further including sensing exteriorly of the building the concentration of said hazardous airborne contaminants at one or more perimeter locations spaced from the building, determining when the concentration of the hazardous airborne contaminant at a perimeter location is at or above a second contamination level, closing all of said outside communication openings to the exterior of the building when the concentration level at a perimeter location reaches or exceeds said second contamination level, and pressurizing the interior of the building after closing said outside communication openings.

18. The method of claim 16 which includes providing a notification within the building of the identity of each uncontaminated area.

19. The method of claim 16 which includes maintaining the communicating openings to the exterior of each contaminated area closed and sealed and the pressure in each uncontaminated area above the pressure in each contaminated area until the contamination level for any hazardous airborne contaminant in each contaminated area falls below the first contamination level therefor.

20. The method of claim 19 wherein said first contamination level for each said hazardous airborne contaminant is the minimum level at which said hazardous airborne contaminant is injurious to humans.

21. The method of claim 20 which includes providing a notification within the building of the identity of each uncontaminated area and the identity of each hazardous airborne contaminant sensed in each contaminated area.

22. The method of claim 21 which includes tracking the location of each person within the building to identify persons in contaminated and uncontaminated areas.

23. The method of claim 20 which includes pressurizing the uncontaminated areas to a pressure within a range of 3 to 10 PSI.

24. The method of claim 20 which includes introducing a decontaminant into the contaminated area after the communicating openings to the exterior of the contaminated area are closed.

25. The method of claim 24 which includes determining when the decontaminant reduces the hazardous airborne contaminant in the contaminated area to a level below the level at which the hazardous airborne contaminant is injurious to humans.

26. An automatic response building defense system for protecting a building against a personnel attack by one or more biological, chemical or nuclear hazardous airborne contaminants, the building having an interior divided into a plurality of separate, enclosed areas, each enclosed area having one or more communicating openings to the exterior of the enclosed area with some of said communicating openings constituting external openings to the building exterior and the remaining communicating openings constituting interior openings to the building interior, said building defense system comprising:

an external closure assembly for closing and sealing each said external opening, said external closure assembly including an external opening closure and sealing unit mounted for movement between an open position to open said external opening and a closed position to close and seal said external opening and a closure drive unit connected to said external opening closure and sealing unit responsive to a first activation signal to move said external opening closure and sealing unit to said closed position and to a second activation signal to move said external opening closure and sealing unit to said open position, a building pressurization assembly operative to pressurize the interior of said building to a pressure above ambient pressure external to said building in response to a pressurization signal, at least one hazardous contaminant sensor assembly including at least one sensor for sensing the presence of said one or more hazardous airborne contaminants, said hazardous contaminant sensor assembly providing sensor assembly output signals in response to sensed hazardous airborne contaminants, and a control processor connected to receive said sensor assembly output signals and operative in response to sensor assembly output signals to provide a first activation signal to each said external closure assembly to cause the closure drive unit therefor to move said external opening closure and sealing unit to the closed position and a pressurization signal to said building pressurization assembly.

27. The automatic response building defense system of claim 26 wherein said at least one hazardous contaminant sensor assembly includes an exterior hazardous contaminant sensor assembly mounted externally of said building and an interior hazardous contaminant sensor assembly mounted in at least one of said separate enclosed areas in the interior of said building.

28. The automatic response building defense system of claim 27 wherein said exterior hazardous contaminant sensor assembly provides sensor assembly output signals in response to sensed hazardous airborne contaminants at or in excess of a first threshold level, and said interior hazardous contaminant sensor assembly provides sensor assembly output signals in response to sensed hazardous airborne contaminants at or in excess of a second threshold level, said second threshold level being lower than said first threshold level.

29. The automatic response building defense system of claim 26 which includes at least one external hazardous contaminant sensor assembly mounted externally of said building.

30. The automatic response building defense system of claim 29 wherein said at least one external hazardous contaminant sensor assembly includes at least one perimeter hazardous contaminant sensor assembly spaced outwardly from said building.

31. The automatic response building defense system of claim 26 which includes at least one internal hazardous contaminant sensor assembly mounted internally within said building.

32. The automatic response building defense system of claim 31 which includes a plurality of internal hazardous contaminant sensor assemblies mounted internally within said building with at least one internal hazardous contaminant sensor assembly being mounted in each of said separate enclosed areas.

33. The automatic response building defense system of claim 31 which includes at least one external hazardous contaminant sensor assembly mounted externally of said building.

34. An automatic response building defense system for protecting a building against a personnel attack by one or more biological, chemical or nuclear hazardous airborne contaminants, the building having an interior divided into a plurality of separate, enclosed areas, each enclosed area having one or more communicating openings to the exterior of the enclosed area with some of said communicating openings constituting external openings to the building exterior and the remaining communicating openings constituting interior openings to the building, said building defense system comprising:

an external closure assembly in each separate enclosed area having an external opening mounted to selectively close and seal or open said external opening, each said external closure assembly operating in response to a first external closure signal to close and seal said external opening, an internal closure assembly in each separate enclosed area to selectively close and seal the interior openings from said separate enclosed area to the building interior, each said internal closure assembly operating in response to a first internal closure signal to close and seal said interior openings, a building pressurization assembly connected to each of said plurality of separate enclosed areas and operative to pressurize one or more of said separate enclosed areas above ambient pressure in response to a pressurization signal, at least one internal hazardous contaminant sensor assembly in at least one of said plurality of separate enclosed areas for sensing the presence of said one or more hazardous airborne contaminants and providing internal sensor output signals in response to sensed hazardous airborne contaminants within said separate enclosed area, a control processor connected to receive said internal sensor output signals and operative in response thereto to provide a first external closure signal to each external closure assembly within the separate enclosed area containing the sensed hazardous airborne contaminant, a first internal closure signal to each internal closure assembly with the separate enclosed area containing the sensed airborne contaminant and a pressurization signal to cause said pressurization unit to pressurize each separate enclosed area other than the separate enclosed area containing the sensed hazardous airborne contaminant.

35. The automatic response building defense system of claim 34 which includes a decontaminant system connected to provide a decontaminant to said separate enclosed areas, said decontaminant system operating in response to a decontaminant signal to selectively provide decontaminant to one or more of said separate, enclosed areas, said control processor operating in response to said sensor output signals to provide a decontaminant signal to cause said decontaminant system to provide decontaminant to the separate enclosed area containing the sensed, hazardous airborne contaminant.

36. The automatic response building defense system of claim 34 which includes at least one exterior hazardous contaminant sensor assembly mounted externally of said building for sensing the presence of said one or more hazardous airborne contaminants externally of said building and providing external sensor signals in response to sensed hazardous airborne contaminants, said control processor being connected to receive said external sensor signals and operative in response thereto to provide a first external closure signal to all external closure assemblies within all separate enclosed areas.

37. The automatic response building defense system of claim 36 wherein said control processor operates in response to external sensor signals to provide a pressurization signal to cause said pressurization unit to pressurize all separate enclosed areas.

38. The automatic response building defense system of claim 37 wherein said exterior hazardous contaminant sensor assembly provides sensor assembly output signals in response to sensed hazardous airborne contaminants at or in excess of a first threshold level, and said interior hazardous contaminant sensor assembly provides sensor assembly output signals in response to sensed hazardous airborne contaminants at or in excess of a second threshold level, said second threshold level being lower than said first threshold level.

39. The automatic response building defense system of claim 37 wherein said at least one exterior hazardous contaminant sensor assembly is a perimeter assembly located in spaced relationship outwardly from said building.

* * * * *